United States Patent

[11] 3,586,430

| [72] | Inventor | Chester S. Rempala<br>Chicago, Ill. |
|---|---|---|
| [21] | Appl. No. | 712,419 |
| [22] | Filed | Mar. 12, 1968 |
| [45] | Patented | June 22, 1971 |
| [73] | Assignee | Bell & Howell Company<br>Chicago, Ill. |

[54] FILM TRANSPORT APPARATUS
18 Claims, 8 Drawing Figs.

[52] U.S. Cl............................................... 353/26,
242/205, 242/209, 352/158, 352/168, 353/78,
353/95, 352/173
[51] Int. Cl........................................................ G03b 23/12
[50] Field of Search.......................................... 352/173,
124, 157, 158, 166, 168, 180, 182; 353/26, 39;
242/202, 203, 209

[56] References Cited
UNITED STATES PATENTS

| 2,953,061 | 9/1960 | Pfaff.................................. | 352/158 (UX) |
| 3,044,350 | 7/1962 | Hartnett............................ | 352/12 X |
| 2,534,083 | 12/1950 | Van Den Broek.................. | 352/173 X |
| 3,084,880 | 4/1963 | Grant................................. | 242/202 X |

Primary Examiner—Samuel S. Matthews
Assistant Examiner—Monroe H. Hayes
Attorneys—Jack H. Hall and Gerald M. Newman ABSTRACT: Film transport apparatus for moving microfilm in either of two directions with equal facility, past a projection aperture. The transport apparatus has identical components on each side of the optical centerline, and maintains continuous tension on the film web during its movement. The film supply spool may be located on either a left or right spindle shaft in order to accommodate microfilm for a correct display orientation regardless of the film wrap direction.

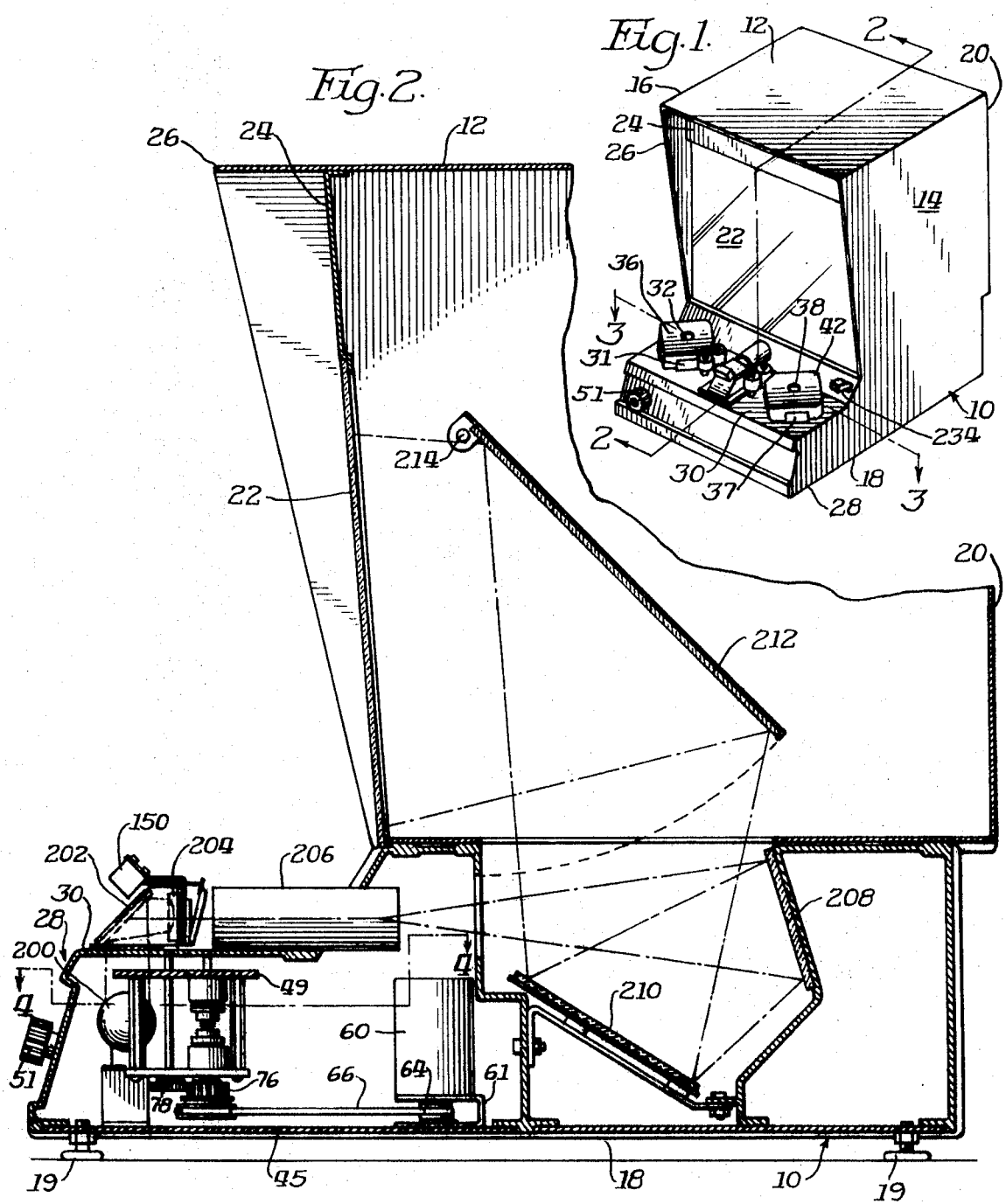

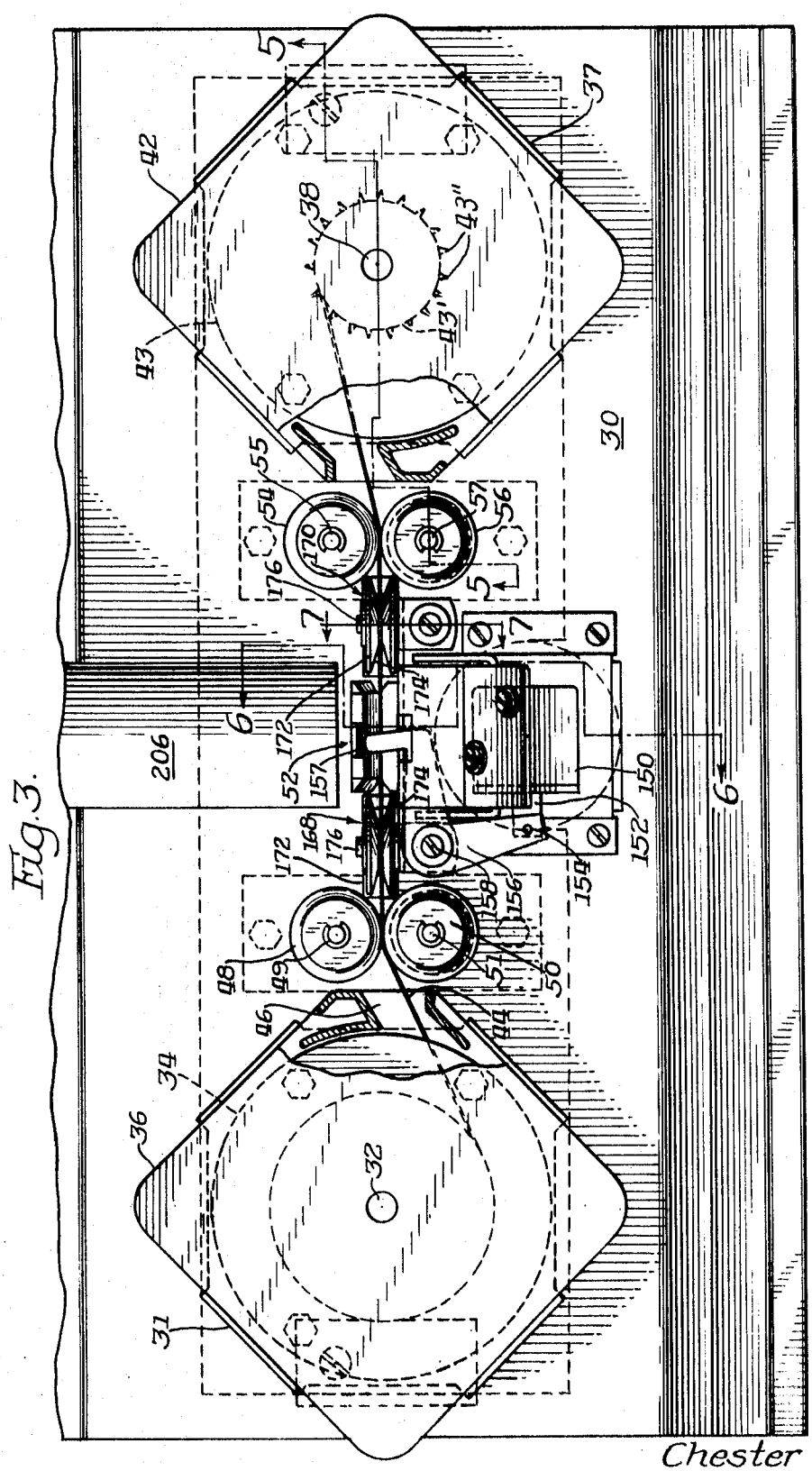

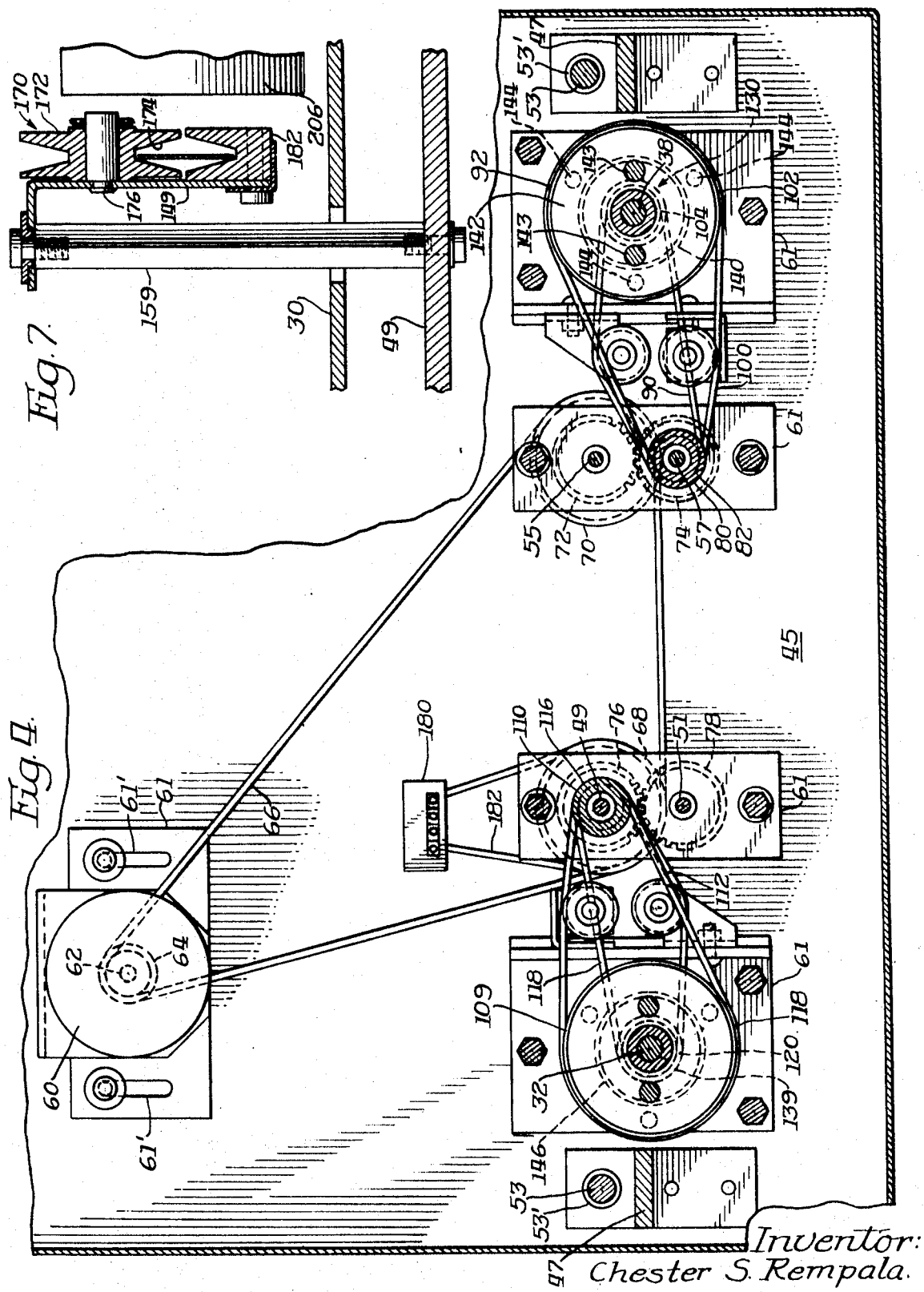

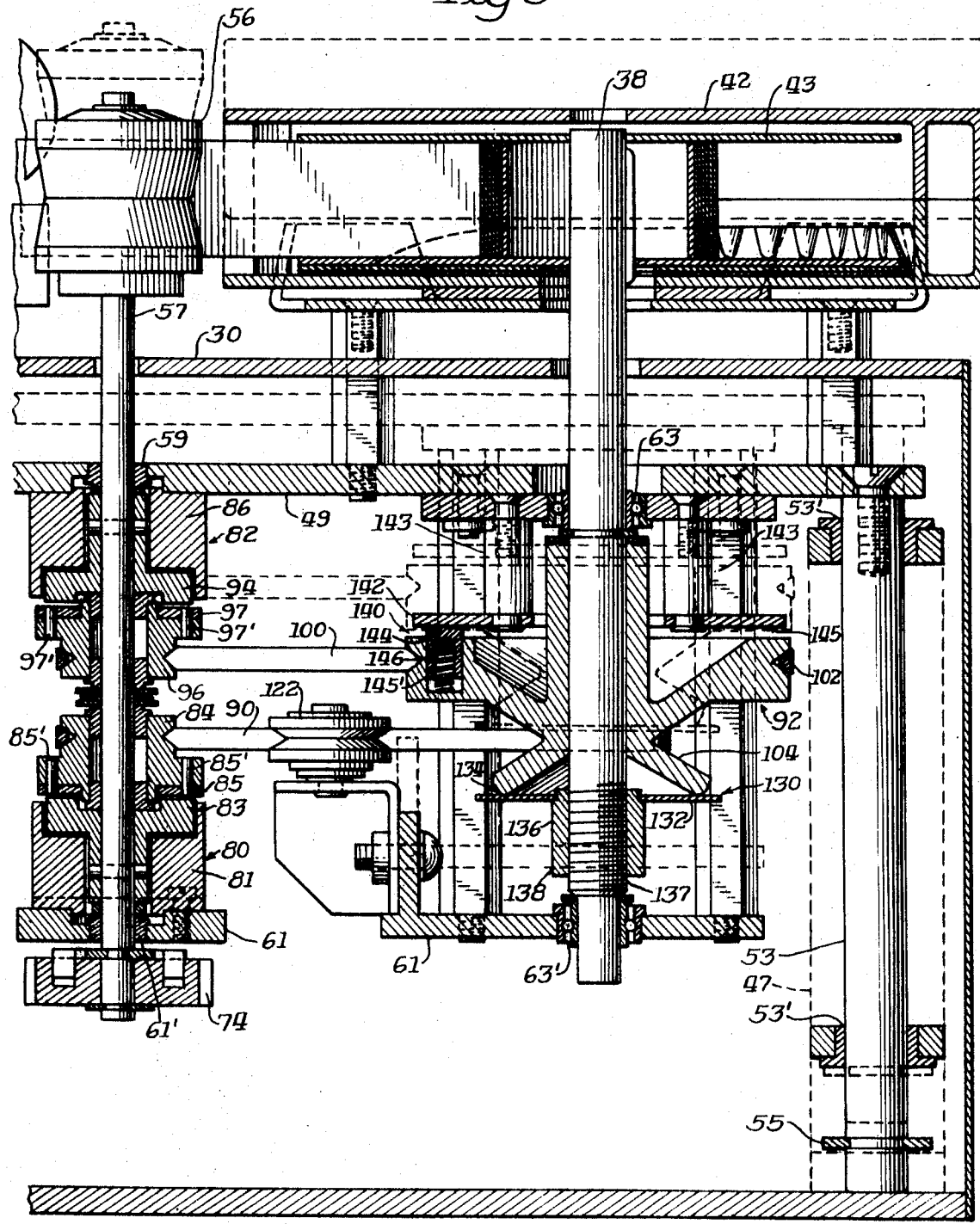

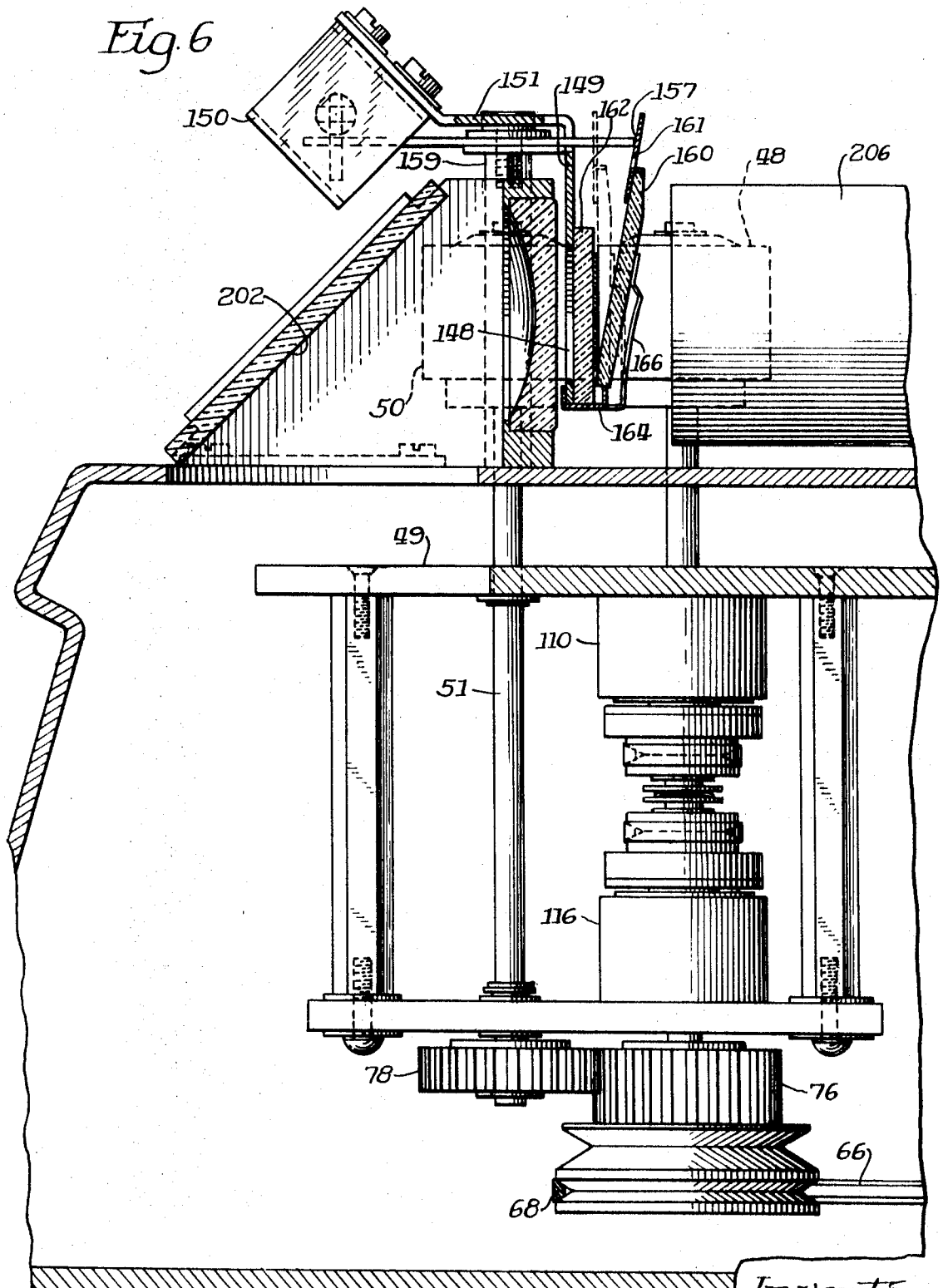

Inventor:
Chester S. Rempala.
By Gerald M. Newman Atty

FILM TRANSPORT APPARATUS

This invention relates in general to microfilm reader/printers, and in particular to film transport apparatus for transporting microfilm from one film spool, past an image projection aperture, to a second film spool. More particularly, this invention relates to film transport apparatus for microfilm reader/printers wherein the transport drive components are symmetrical and substantially identical on each side of the apparatus centerline. The invention further relates to film transport apparatus wherein the film supply spool may be located on either of two spindle shafts disposed on opposite sides of the projection aperture, wherein the film is automatically threaded between the film spools and wherein a constant tension is maintained on the film during its travel therebetween.

The adoption of microfilm for visual information storage requires compatible equipment for rapid and accurate retrieval of the stored images. Microfilm is typically retained on a flanged spool or reel which may be conveniently housed in a cartridge. Means may be provided on the cartridge exterior for identifying the information contained therein, and may also include the exact location of the particular information along the length of the film.

Stored information is typically retrieved by a microfilm reader which includes apparatus for transporting the film through a projection path which includes a magnifying lens system for enlarged display of individual images on an integral display screen. The microfilm reader may also include auxiliary equipment for permanently reproducing the stored information through various photographic or electrostatic methods. Mechanically, the heart of a microfilm reader, and the area wherein most of the problems lie, is the film transport apparatus. The apparatus must be capable of accurately and reliably moving the film past an aperture for projection onto the display screen. In addition, it must be of economical and simple construction and must be easily serviced. The apparatus must be capable of moving the film at selectively variable velocities without imposing inordinate stress upon the film while maintaining some film tension to prevent jamming during movement.

When microfilm is stored on spools which are housed in individual cartridges, additional problems are presented since most prior art microfilm readers are designed for the supply spool to be located on the left-hand spindle for film transportation past the projection aperture to the right-hand spindle. The supply spindles of these prior art readers could only be driven in a single direction for unwrapping the film, either clockwise or counterclockwise. Thus, microfilm wrapped on a supply spool for reading with a reader having a clockwise rotating supply spindle, could not be read on readers having a counterclockwise rotating supply spindle without altering the film unwrapping direction. The incompatibility of the two reader types is primarily due to misorientation of the images, that is, when film is displayed on the wrong microfilm reader the image reads backwards, a condition commonly known as "handing."

One major drawback to the serious use of microfilm was that when individual film cartridges were utilized, it entailed a complicated and time consuming procedure in threading the film from the supply cartridge, through associated capstan rollers and the projection aperture, and onto the film takeup cartridge or spool.

This invention obviates the above and many other problems associated with microfilm transport apparatus by providing a novel and improved microfilm transport drive which is capable of automatically threading the leading end of microfilm web from the film supply cartridge, through a path which includes a projection aperture, and onto a film takeup spool. The film leading end is automatically secured to the hub of the takeup spool which may be housed within a cartridge.

A microfilm reader utilizing the film transport system of the invention is fully compatible with other readers, since the film supply cartridge may be positioned on either the right or left spindle thereby enabling rapid reorientation of a backward reading image.

The film transport apparatus of the invention is capable of rapidly and accurately transporting microfilm from the supply cartridge to a takeup cartridge located on the opposite spindle, while maintaining a constant tension on the film web without imposing inordinate stress thereon which may cause damage such as tearing or stretching of the microfilm. Further, the microfilm transport mechanism of the invention comprises two substantially identical drive trains symmetrical about a centerline. The use of identical drive trains reduces manufacturing costs by facilitating assembly and by limiting the number of different elements required which contributes to lower tooling, storage, and inventory costs.

In accordance with the invention, the identical film drive trains are located on either side of the centerline defined by a projection aperture. Each of the drive trains comprise a pair of rotatable capstans, one capstan of each pair including a pair of selectively energizable clutches having drive belts trained therefrom to an adjacent spindle shaft capable of interchangeably accepting a film supply or takeup cartridge. Each clutch is coupled to a different diameter pulley fixed to the spindle shaft, thus the drive ratio between the capstan and the spindle shaft may be varied by energizing one or the other of the clutches. By varying the drive ratios to the spindle shafts, the drive motor attempts to drive the spool taking up the film faster than the spool from which the film is supplied, although the actual film velocity is regulated by the capstans. To prevent excessive stress on the microfilm due to the intentionally imposed velocity differential of the microfilm supply and takeup spools, a slip clutch is provided in each drive train between the single drive motor and each spindle. These clutches limit the velocity of the outermost wrap of film on each spool to the film velocity as regulated by the capstans and they may be adjusted to maintain a greater or lesser film tension, as desired.

A drag break is also provided in each drive train to absorb the rotational moment of inertia which exists upon deenergization of the clutches to prevent possible rewrap of the film about the spools.

A particularly novel feature of the invention is the clutch arrangement whereby identical clutches are energized for transporting the film in a forward direction from right to left when the film supply is located on the right-hand spindle, as are used to rewind the film from right to left when the supply spool is located on the left-hand spindle.

Accordingly, the primary object of this invention is to provide an inexpensive yet reliable, accurate, and rapid microfilm transport system for transporting microfilm between two film spools.

Another object of this invention is to provide microfilm transport apparatus capable of automatically threading microfilm from a film supply spool, past a projection aperture, and onto a film takeup spool.

A further object of this invention is to provide film transport apparatus having identical drive components utilized on each side of a microfilm reader optical centerline for simplicity of assembly and lower manufacturing costs.

Another object of this invention is to provide film transport apparatus wherein the film is continually tensed regardless of the direction of film movement.

A feature of this invention is the energization of identical clutches for transporting the film in a given direction regardless of whether the film supply spool is located on the left-hand or right-hand spindle.

Other objects and features of this invention will become apparent from an understanding of the following description taken in conjunction with the accompanying drawings wherein:

FIG. 1 is a top-right side perspective view of the microfilm reader embodying the present invention.

FIG. 2 is an enlarged cross-sectional elevational view taken along line 2–2 of FIG. 1.

FIG. 3 is an enlarged top plan view of the film transport apparatus of the invention taken along line 3—3 of FIG. 1.

FIG. 4 is a plan view taken along line 4—4 of FIG. 2 illustrating the drive belt arrangement of the transport apparatus of the invention.

FIG. 5 is an enlarged cross-sectional elevational view taken along line 5—5 of FIG. 3 illustrating the right drive train of the invention and a microfilm spool and cartridge which may be used therewith.

FIG. 6 is an enlarged fragmentary cross-sectional elevational view taken along line 6—6 of FIG. 3 illustrating a small portion of the drive train and axially aligned clutches, and the projection aperture gate and gate solenoid associated with the transport apparatus.

FIG. 7 is an enlarged fragmentary cross-sectional elevational view taken along line 7—7 of FIG. 3 showing a portion of the film path guide.

Figure 8:
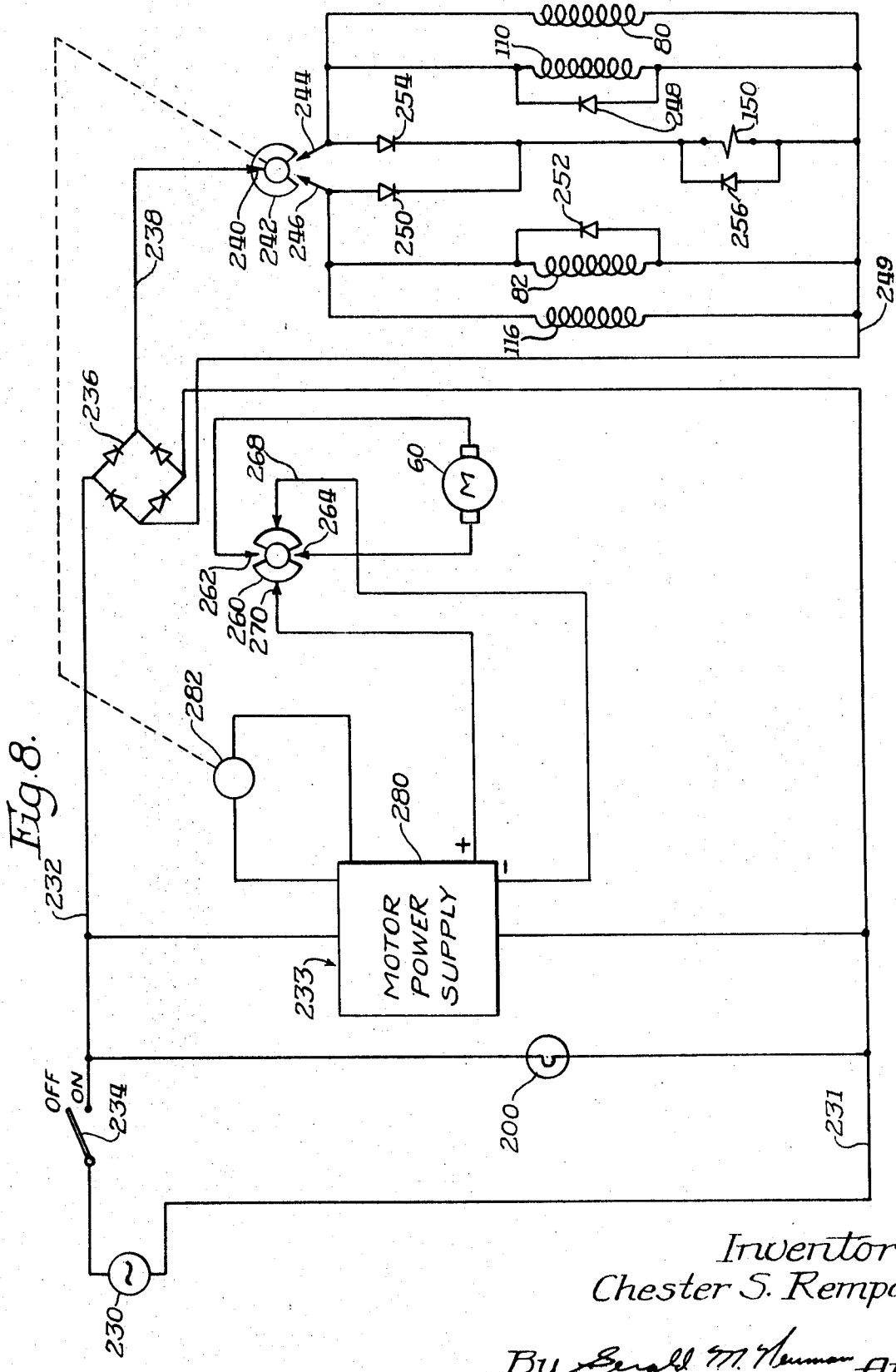
FIG. 8 is a schematic wiring diagram illustrating the circuitry of the transport apparatus of the invention.

With reference to FIGS. 1 and 2 of the drawings, there is shown a microfilm reader incorporating the invention, generally referred to by reference numeral 10. The reader includes a cabinet having a top wall 12, sidewalls 14 and 16, a bottom wall 18 having adjustable support pads 19, a backwall 20 and a front wall 24. The front wall carries a display screen 22 for viewing a projected image and a hood 26 for preventing external illumination from "washing out" the image.

A boxlike enclosure 28 extends forwardly from the lower front portion of the reader. This enclosure houses the film drive apparatus of the invention and includes a loading shelf 30 having a cartridge holder 31 for supporting a microfilm cartridge 36 on a spindle 32 on the left side, and a second cartridge holder 37 for supporting another film cartridge 42 on a spindle 38 on the right side of the shelf. Each of the cartridges have film spools, such as spools 34 and 43 (FIG. 3) housed therein, and each cartridge and spool assembly has the capability of automatically advancing the leading end of a film web 44 into the film path, and also for automatically securing the leading end onto the hub of the takeup spool.

Referring now to FIGS. 3, 4 and 5, for purposes of the immediate description, the film spool cartridge supplying microfilm to the reader will be assumed to be mounted on the left-hand spindle for moving the film through the projection aperture to the right spool and cartridge. As will be realized from a further description of the invention, the deck is vertically movable relative to the bottom plate by means not shown which are controlled by a "scan" knob 51 accessible from the exterior of the cabinet. Deck movement enables the microimage to be moved relative to the optical system for scanning the projected image on the screen. Movement is limited to the vertical direction by a pair of deck guide rods 53 journaled at 53' in frame members 47, and maximum upward movement to a position shown in dotted lines in FIG. 5 is defined by q37 C" washers 55 secured to the lower end of the guide rods, abutting the lower journal.

The path of the microfilm over shelf 30 includes an egress opening 46 through supply cartridge 36, a pair of nip forming capstan rollers 48 and 50, a projection aperture 52 through which light is directed from a source, and a second pair of capstan rollers 54 and 56. From capstan rollers 54—56, the film is advanced to cartridge 42 wherein spool 43 includes a hub 43' having protruding teeth, not shown, for automatically securing the film thereto. The hub may incorporate protruding teeth as taught by U.S. Pat. No. 3,053,465 which issued to Bruno Michaels on Sept. 11, 1962 and is assigned to the same assignee as the instant patent application.

Capstan rollers 48 and 50 are corotatably secured to a pair of vertical capstan shafts, 49 and 51 respectively, while capstan rollers 54 and 56 are similarly secured to a second pair of vertical capstan shafts, 55 and 57, respectively. Each of the capstan shafts are journaled for rotation to the deck as at 59, and to a lower deck support 61, as at 61'. (FIG. 5) Similarly spindle shafts 32 and 38 are journaled for rotation to the deck and lower deck support at 63 and 63', respectively.

One capstan shaft of each capstan shaft pair includes a grooved pulley fixed to the lower end thereof for receiving power from a drive motor and each of the capstan shaft pairs are arranged to rotate together, but in opposite directions.

Specifically, as best seen in FIG. 4, capstan shaft 49 on the left side of the drive is provided with a grooved pulley 68 and a gear 76 at the lower end. Shaft 55 also has a pulley 70 and a gear 72 secured to its lower end. The remaining capstan shafts, 51 and 57, have gears 78 and 74, respectively, secured thereto in meshing engagement with gears 72 and 76, respectively.

Grooved pulleys 68 and 70 are of equal diameter, thus shafts 49 and 55 rotate at identical speeds. Similarly, each of the gears 72, 74, 76 and 78 have the same pitch diameter, thus they also rotate at identical speeds and impart an identical peripheral velocity to the capstan rollers which transport the film.

Capstan shafts 49 and 57, which rotate in opposite directions, each have a pair of selectively energizable clutches secured thereto. Since each of the clutch arrangements are identical except for the oppositely rotating shafts, only the right side will be shown in detail to eliminate duplication of description.

Turning to FIG. 5 wherein the right drive train is illustrated, capstan shaft 57 is seen to include a lower clutch 80 and an upper clutch 82, each of which may be selectively energized by control means described hereinafter. As will be seen, energization of the particular clutch is dependent upon the function of the spindle with which the clutch is associated which is in turn is dependent upon the direction of film movement.

The clutches are vertically aligned and coaxial with shaft 57 with the upper clutch depending from deck 49, and the lower clutch secured to member 61. The lower clutch includes an electrically energizable core 81, enclosing a driving clutch member 83 staked to shaft 57, and further includes a driven clutch member 84 which is freely rotatably relative to the shaft. The two clutch members are engaged via a movable clapper plate 85 which is pinned to the driven member by pins 85' and attracted to the driving member during clutch energization. Similarly, upper clutch 82 includes an energizable core 86, a driving member 94 staked to the shaft, a driven member 96 freely rotatable about the shaft, and a clapper plate 97 pinned to the driven member by pins 97'. Each of the driven members have a circumferential belt groove of equal pitch diameter.

A similar clutch arrangement as shown in FIG. 6 with much of the detail eliminated, is provided for the left-hand drive train, said drive train including an upper clutch 110 and a lower clutch 116.

Each of the spindle shafts include a pulley freely rotatable with respect thereto. As seen in FIGS. 4 and 5, for the right drive train, a pulley 92 is positioned on spindle shaft 38. The pulley has two belt grooves, a large diameter groove 102 and a small diameter groove 104. Similarily, the left spindle shaft 32 includes a pulley 109 freely rotatable thereon having a small pulley groove 120 and a large pulley groove 118.

Each of the spindle shafts also include a slip clutch for transmitting rotation from the freely rotating spindle pulley to the spindle shaft. The slip clutch of the right drive train, generally referred to by reference numeral 130, comprises a slip clutch plate 132 and a friction surface 134 on the pulley, which may be fabricated of Delron or a similar material. The plate is secured to a threaded nut 136 which cooperates with exterior threads 137 on the shaft and a threaded locknut 138. The amount of torque transmitted through the slip clutch may be varied by adjusting the nuts to provide different pressure between the plate and pulley.

The slip clutch functions as an override from the motor so that when the spindle functions as a film takeup, the pulley may be driven faster than the spindle rotates to maintain continuous tension on the film web. Of course, if the particular spindle supports the film supply, in order to maintain continuous tension, the microfilm is pulled from the spool faster than the spindle is driven, and the same slip clutch will also allow for this occurrence. The left drive also includes a slip clutch 139, not shown in detail.

A drag brake 140 is also associated with the right spindle shaft to prevent unimpeded rotation thereof upon deenergization of clutches 80 and 82 by absorbing the rotational moment of inertia of the spools. The drag brake comprises a stationary brake plate 142 dependingly supported from the deck by rods 143 so that a lower friction surface 145 thereof is adjacent the top side of pulley 102. The pulley is provided with three blind holes 145 (only one is shown in FIG. 5) having brakeshoes 144 disposed therein which are biased by springs 146 into continual contact with the lower friction surface. The friction between the moving brakeshoes fixed to the pulley and the brake plate, provide a constant drag on the spindle shaft and spool through the slip clutch 130. A drag brake 146 of similar construction is also provided for spindle shaft 32.

While constructionally, the left and right sides of the drive have identical components, there is one major difference in the drive arrangement, namely, the capstan shafts to which the clutches are secured. The clutches of the drive on the left side of the reader are driven by a capstan shaft which rotates in one direction, while the clutches on the right side are driven by a capstan shaft which turns in the opposite direction.

Turning to consideration of the FIG. 4, the power source and belt drive train will be described in detail. The prime mover comprises a single drive motor 60 adjustably secured to the bottom plate by a bracket 61 having slots 61'. The motor is selectively reversible for rotation in either the clockwise or counterclockwise direction. Drive motor 60 includes a single output shaft 62 having a motor pulley 64 secured thereto. The motor drives a main drive belt 66 which is trained about grooved capstan pulleys 68 and 70 of capstan shafts 49 and 55, respectively.

Since, as noted above pulleys 68 and 70 are of equal diameter, capstan shafts 49 and 55 rotate at the same speed and each rotate in the same direction as the motor shaft. Also, as noted above, gear 76 of capstan shaft 49 meshingly engages gear 78 of capstan shaft 51 to drive the latter shaft in the opposite direction, and capstan shaft 55 is similarly coupled to capstan 57 through gears 72 and 74. Through the intermeshing gears, each of the capstan rollers are driven at the same speed, and it is the capstan rollers which determine the velocity of the film through the reader responsive to the speed and direction of the drive motor as will be explained in greater detail below.

Each clutch driven member on one capstan shaft of each pair, is coupled to its adjacent spindle shaft. As illustrated in FIGS. 4 and 5, the right drive train includes a drive belt 90 trained about driven member 84 of the lower clutch and the small pulley groove 104 of spindle pulley 92. A second belt 100 is trained about driven member 96 of upper clutch 82 and the large pulley groove 102 of the spindle pulley. Since the power transmission direction is from the capstan shaft to the spindle shaft, there is a speed reduction of the spindle shaft when the upper pulley is engaged, as compared to engagement of the lower pulley.

A similar pair of drive belts is also provided for the drive train on the left side, namely, a belt 118 is trained about the driven member of lower clutch 116 and small pulley groove 120 of pulley 109, and a second belt 112 is trained about the upper clutch 110 and the large groove 118 of pulley 109. Thus, the drive ratio between this capstan shaft and spindle shaft may also be altered depending upon the clutch energized.

A belt tightener 122 is provided for each of the four belts between the clutches and spindle pulleys to compensate for belt wear and manufacturing tolerances.

From the above description, it is clearly seen that each of the elements of the right drive train is duplicated in the left drive train, including the capstan shafts, rollers, clutches, belts, and the spindle shaft and its associated slip clutch and drag brake. This mode of construction reduces the manufacturing costs and associated supply problems encountered in manufacturing and replacement, while providing a simple, efficient, and versatile film drive.

OPERATION

When the microfilm supply spool and cartridge are located on the left-hand spindle shaft to obtain a correctly oriented image as dictated by the film wrap direction, and when forward movement to the right spindle is desired, the drive motor is energized for counterclockwise rotation, and clutches 110 and 80 on their respective left and right capstan shafts are engaged. Thus capstan shaft 49 imparts the correct counterclockwise movement to spindle 32 through belt 112, and clockwise rotating capstan 57 through its engaged clutch and belt 90 drives spool 43 to takeup the film in a correct wrapping direction.

The primary purpose in driving the supply spool is to achieve automatic egress of the film leading-end for advancement into the film track, and automatic threading. Accordingly, the supply spool and cartridge may be constructed in accordance with the description provided in a pending patent application entitled "Film Cartridge, Case and Spool," filed on Oct. 2, 1967, and bearing Ser. No. 672,181, now Pat. No. 3,502,283. This pending application is assigned to the same assignee as the present application.

Since the supply spool is positively driven, save for the different speed ratios between the supply and takeup spindles, difficulty would be encountered in maintaining proper film tension. In accordance with the invention, the velocity of the film through the reader is determined by the peripheral velocity of the capstan rollers which may be driven at varying speeds by the drive motor, by control means to be explained below. The drive ratio to the supply spool is designed so that when the supply spool is full, the peripheral film velocity is 5 percent less than the capstan velocity. Thus, film is pulled out of the spool and the spindle shaft rotates faster than its pulley, the difference being taken up by the slip clutch.

The drive ratio to the right-hand spool which now functions to takeup film, is sufficient to impart a peripheral velocity to the spool hub of 5 percent greater than the capstan velocity. This velocity differential is also taken up by the slip clutch associated therewith.

As the leading end of the film emerges from the supply cartridge, it enters the nip formed by capstan rollers 48 and 50, and is advanced past projection aperture 52 and into the nip formed by capstan rollers 54 and 57 which feed the film into the takeup spool.

On the takeup spool, the film is directed toward the spool hub and is automatically wrapped thereabout by means well known in the art such as hub teeth which cooperate with sprocket holes in the film leading end. Since, in accordance with the invention, the film supply may be located on either the left or right spindle, each of the spools and cartridges are preferably of identical construction, with respect to automatically advancing film therefrom and securing the leading end thereto. This also allows the film to be completely removed from the supply spool and automatically returned thereto.

Continuing the operational description, when it is desired to return the film to the left-hand supply spindle, clutches 80 and 110 are disengaged, the drive motor direction is reversed so that it now rotates clockwise, and clutches 116 and 82 are engaged. Capstan shafts 49 and 55 are driven clockwise but capstan shaft 57 is now driven counterclockwise. The left spindle pulley rotates clockwise at a relatively high speed to rewind the film and the right spindle pulley turns counterclockwise more slowly to feed out the film. Thus the film is now dragged out of the right-hand spool and continuous tension is still maintained. It should again be noted that the actual film velocity is determined by the peripheral velocity of the capstan rollers which are in full control of the film subsequent to its being threaded through the film path.

To reorient the image if the film wrap direction and image orientation on the supply spool are incorrect, the cartridge and spool are relocated to the right spindle without inverting the spool.

Now the film must be transported to the left spindle where the film and cartridge function as the takeup. For this drive mode, the identical clutches are engaged and the identical motor direction (clockwise) is provided as was used during rewind with the supply spool on the left spindle. That is, clutch 116 of the left drive, and clutch 82 of the right drive are engaged.

For returning the film to the supply spool when it is located on the right spindle, the exact same clutches are engaged as were engaged when the supply was located on the left spindle and forward operation to the right spindle was desired, that is, clutch 80 associated with capstan shaft 74 and clutch 110 associated with capstan shaft 49 are engaged. Also, the motor is driven counterclockwise.

Thus, in accordance with the invention, film movement in a given direction is easily obtained by energizing the identical clutches and providing the identical motor rotation direction regardless of the location of the supply spool.

Referring now to FIGS. 3, 6, and 7, the projection aperture, film gate mechanism and adjacent film guide structure, will be described in detail.

The function of the film gate mechanism is to maintain the microfilm in a predetermined film plane adjacent the projection aperture, during viewing, to facilitate proper focusing of the image for display on the screen. The gate must allow unimpeded movement of the film therethrough during travel from one spool to the other to prevent damaging the emulsion.

The projection aperture functions to provide a light mask, the light passing through the aperture and then through the microfilm. The aperture, referred to by reference numeral 148, is disposed in a vertical aperture plate 149 located at the optical centerline of the reader, and is in between the two pairs of capstan rollers.

The film gate is also located at the optical centerline, adjacent the aperture, and includes an operating mechanism comprising a solenoid 150 secured to an extending leg 151 of the aperture plate. The solenoid has a plunger 152 arranged for horizontal movement, upon energization thereof. The plunger is pivotably connected by a pin 154 to a bellcrank 156 pivotally mounted at 158 to an upstanding stationary support member 159 secured to the deck. One leg of the bellcrank terminates in a nose portion 157.

The gate comprises a first transparent flat 160 which may be fabricated of glass. Flat 160 is mounted in a frame 161, the top of which abuts the nose of the bellcrank, and may be tilted away from the vertical dotted line position shown in FIG. 6, against the force of a pair of resilient leaf springs 166, which straddle the glass. A second transparent flat 162 which may also be constructed of glass, is fixedly secured within a frame 164 and the film passes between the glass flats which are located in line with the projection aperture. Upon energizing the solenoid, the plunger is retracted pivoting the bellcrank counterclockwise as viewed in FIG. 3. The bellcrank nose 157 urges flat 160 and its frame away from the vertical position, establishing a V-shaped space between the flats which allows free film movement. Of course, the solenoid is energized during film movement and is deenergized when the clutches are deenergized to maintain the film in a fixed, prefocused plane.

As best seen in FIGS. 3 and 7, film guides 168 and 170 are provided on each side of the gate, inwardly of the mating capstan rollers, to facilitate automatic threading of the film through the gate and between the spools. Each film guide comprises an upper roller 172 having a circumferential V-shaped groove 174 which is freely rotatable about a horizontal pivot pin 176, staked to the aperture plate 149. A complimentary V-shaped block 182 also is secured to plate 149 below the rollers.

The block and rollers are arranged with opposing apexes spaced apart slightly greater than the height of the film to provide an unrestricted yet definite guide path for the film from the supply capstans, through the gate mechanism, to the takeup capstans.

As seen in FIG. 4, a counter 180 is coupled to a pulley on capstan shaft 49 by a belt 182 to provide continuous reference to the microimages. Since capstan shaft 49 is always driven in the direction of film movement, the counter provides continuous reference to the image location along the film length.

Turning now to FIGS. 2 and 6, the light path and optical components associated with the reader will be briefly described. A light source 200, which may comprise a high intensity lamp, is mounted in the front portion of the reader adjacent the film transport apparatus. Light rays are received from the source by a first reflecting mirror 202 which is mounted at a 45° angle to the horizontal, directly below solenoid 150. The light rays are reflected horizontally from mirror 202 through an objective lens 204 which converges the rays for passage through the projection aperture, the glass flats, and the microfilm. The light is subsequently directed through an objective lens system 206 and impinges upon a second mirror 208 which reflects the light to a third mirror 210 for subsequent reflection to a movable fourth mirror 212 which in turn reflects the light to the display screen 22. Movable mirror 212 is pivoted at 214 by means not shown and may be rotated clockwise so as to prevent its interference with light from mirror 210 which may then be directed at the top of the cabinet. Although not shown in the drawings, auxiliary printing apparatus may be mounted on top of the reader to obtain permanent copies of the projected microimage by photographic or xerographic means.

Turning now to the wiring diagram shown in FIG. 8, the electrical circuitry associated with the reader will be briefly described.

An AC source 230 is serially connected to an on-off switch 234 accessible from the exterior of the reader. The switch controls the flow of electrical power from the source to the lamp 200, a motor power supply 233, and the energizable clutches, through a rotary selector switch 242. The lamp is energized continuously when switch 234 is closed, and the reader is "on."

A diode network 236 arranged as a bridge rectifier is connected to the source through switch 234 and conductors 231 and 232. One side of the rectifier output is coupled by a conductor 238 to a common terminal 240 of the rotary selector switch 242, which also includes switch contacts 244 and 246.

The energizable coils of clutches 80 and 110 are parallelly coupled, and one end thereof is connected to switch contact 244 while the remaining end is connected to a common lead 249 from the bridge rectifier output. A diode 248 is coupled parallel to clutches 80 and 110 to suppress back EMF arcing at switch contact 244 upon deenergization of the clutches. A steering diode 250 is also provided to prevent the current path from switch contact 244 from extending into an adjacent clutch network. The steering diode greatly simplifies the construction of the rotary switch.

Solenoid 150 is also parallelly connected to clutches 80 and 110 and is energized simultaneously therewith to open the film gate. A diode 256 suppresses arcing from the solenoid, at the contacts of switch 242.

Switch contact 246 is connected to the remaining two clutches 82 and 116, and to the solenoid, all of which are connected in parallel. The contact is protected by an arc suppressing diodes 252 and 256, and a steering diode 254 is also provided. The free terminals of these latter clutches and the solenoid are connected to the bridge rectifier through conductor 249.

Operationally, when switch 246 is rotated clockwise, a circuit is completed through contacts 240 and 244 which energizes clutches 80 and 110, and also energizes the gate solenoid 150. With the motor operating, clutches 80 and 110 transport the film from the left spindle to the right.

To transport the film from right to left, the rotary switch is turned counterclockwise, energizing clutches 82 and 116 and energizing the solenoid 150.

When an image is aligned in the projection aperture for viewing on the screen, the current path to contacts 244 and 246 is open, and the clutches and solenoid are deenergized.

A second rotary switch 260 having switch contacts 262 and 264 connected to drive motor 60, and having switch contacts 268 and 270 connected to a diagrammatically illustrated MOTOR POWER SUPPLY 280, is provided. Switch 260 is mechanically coupled to switch 242 for simultaneous movement therewith as indicated by the connecting dash lines. The MOTOR POWER SUPPLY is connected to the source by conductors 231 and 232. The power supply includes various rectifying and control components and may also incorporate a motor comparator circuit for obtaining uniform motor speed independent of torque.

As rotary switch 260 is turned clockwise, an electrical path is completed between switch contacts 264 and 268, and between contacts 262 and 270, for rotating the motor in the proper direction for left to right film movement. Turning the switch counterclockwise completes a path between contacts 264 and 270, and between contacts 262 and 268, reversing the motor direction for right to left film movement. The motor speed is controlled by a rotary potentiometer 282 electrically connected to the MOTOR POWER SUPPLY in a manner well known by those familiar with the art and mechanically coupled to the rotary switches as indicated by the dash lines.

It is obvious that upon study by those skilled in the art the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are defined as follows:

I claim:

1. Apparatus for selectively transporting film in either of two directions between a first rotatably mounted film spool having a first film wrap diameter, and a second rotatably mounted film spool having a second film wrap diameter and for maintaining continuous film tension regardless of the wrap diameters or the transport direction, comprising:
   a drive motor connectable to an electric source;
   two pairs of rotatably mounted capstan shafts having mating capstan rollers secured thereto and a pulley affixed to one capstan shaft of each pair for receiving a drive belt trained thereabout from said drive motor for moving said film at a given linear velocity from either spool to the other;
   means including said capstan shafts for coupling said motor to each of said film spools for driving the spool on which the film is being taken up in a film wrapping direction and at a speed such that the peripheral velocity of the outer film wrap is greater than said given velocity;
   said clutch means comprising two pairs of electrically energizable clutches, one pair of clutches cooperating with each capstan pair;
   drive belts trained from each of said clutch pairs to pulleys having different pulley diameters for rotatably driving each of said spools;
   slip clutch means compensating for the peripheral velocity differential to prevent imposing inordinant stress upon said film; and
   an electrical switch having at least two switch positions interposed between said motor and said source for selectively changing drive direction of said motor thereby changing the transport direction of said film, said switch means energizing one clutch of each clutch pair for driving said spools at different speeds responsive to the film transport direction.

2. The apparatus as set forth in claim 1 wherein the capstan shafts drive each of said clutch pairs in opposite directions for driving one of said film spools counterclockwise and the other film spool clockwise.

3. The apparatus as set forth in claim 2 wherein the drive elements associated with each of said film spools, including said capstans and said clutches, are identical,
   and including additionally:
   a projection aperture disposed in the path of movement of said film, said aperture including gate means operable responsive to nonmovement of said film for maintaining it in a fixed, prefocused plane.

4. In a microfilm reader, apparatus for automatically training and selectively transporting film in either of two directions between two film spools and past a projection aperture, and for maintaining continuous film tension regardless of the film wrap diameter on said spools, comprising:
   a deck and a frame;
   means rotatably supporting said film spools in spaced apart relation on said deck, one of said spools serving as a film supply spool and the other as a film takeup spool;
   capstan means adjacent said spools defining a film path therebetween extending past said projection aperture;
   said capstan means driving the film past said aperture at a controlled velocity;
   means cooperating with the film supply spool for feeding a leading end of said film into said film path for advancement to the takeup spool;
   means integral with said takeup spool for automatically securing said leading end thereto;
   and reversible drive means imparting rotation to said spools and capstan for automatically training said film through said path between said spools and moving said film in either direction past said projection aperture;
   said drive means driving said film takeup spool sufficiently fast, and driving said supply spool sufficiently slow, so as to maintain continuous tension on said film.

5. The microfilm reader as set forth in claim 4 including additionally:
   identical cartridges housing each of said film spools for rotation therein;
   and wherein said means rotatably supporting said film spools comprise a pair of spindles each capable of receiving either of said cartridged spools, whereby said spools may be interchangeably positioned on said spindles for reorienting a reverse reading image.

6. The microfilm reader as set forth in claim 5 wherein
   said capstan means comprise two pairs of capstan shafts rotatably secured to said frame, each of said capstan shafts having a capstan roller secured thereto and disposed in pairs in interferring relationship in said film path;
   and wherein said reversible drive means include a single reversible drive motor directly coupled to one capstan shaft of each pair;
   two selectively energizable clutches secured to each pair of capstan shafts;
   means coupling each clutch of one capstan shaft pair to one spindle shaft, and each clutch of the other capstan shaft pair to the second spindle shaft;
   one of said clutches of each clutch pair being energized responsive to each drive direction for establishing different drive ratios between said motor and each spindle shaft for maintaining said film continuously tensed.

7. The microfilm reader as set forth in claim 6 including additionally:
   counter means coupled to said drive means for indicating the relative location of microimages on said film;
   and wherein said drive means further comprise:
   a slip clutch interposed between each of said energizable clutches and the spindle shafts to which they are coupled for obviating inordinate stress on said film;
   and drag brake means acting on said spindles and said spools through said slip clutches for absorbing the rotational moment of inertia thereof upon deenergization of said clutches.

8. The microfilm reader as set forth in claim 7 further including:

means cooperating with said projection aperture for immobilizing said microfilm therein in a fixed focal plane upon deenergization of said clutches,
and means for vertically displacing said immobilized microfilm for scanning a microimage to be viewed.

9. Apparatus for selectively moving microfilm in either of two directions between two spaced apart film spools and past a projection aperture, wherein said aperture is located substantially at the apparatus centerline, comprising:
a reversible drive motor;
two drive trains, each capable of interchangeably functioning as a film takeup or film supply drive, and each having substantially identical drive elements disposed on opposite sides of said centerline, each of said drive trains including:
rotatably mounted spindle means adapted to receive a spool for corotation therewith;
a pair of corotatable capstan shafts having capstan means cooperating with said film, one shaft of each pair having two selectively energizable clutches corotatably fixed thereto and coupled to said spindle means;
means coupling said drive motor to the capstan shafts and spindle means of each drive train for moving the film in either direction past said aperture.

10. The apparatus as defined in claim 9 wherein:
each of said clutches include
a driving member fixed to its capstan shaft, and a driven member; belt means coupling each of said driven members to
a dual diameter pulley affixed to the spindle means of each drive train,
whereby upon energizing one clutch of each drive train, said driven members are coupled to said driving members for driving the spool taking up said film faster than the spool supplying said film, thereby maintaining continuous film tension.

11. The apparatus ad defined in claim 10 including additionally:
cartridges for housing said film spools, said cartridges being interchangeably positionable on either of said spindle means for reorienting a reverse reading image by changing said cartridge from one spindle to the other;
and wherein the same clutch of each drive train is energized when said film is moved in a given direction regardless of the spindle means on which the spool supplying said film is positioned.

12. The apparatus as defined in claim 11 wherein said capstan means define a selectively given film velocity past said aperture;
and wherein each of said drive trains further include:
slip clutch means interposed between said drive motor and said spindle shaft for limiting the velocity of the outer film wrap on the takeup spool to said given velocity, and for allowing the other spool to supply film at said given velocity;
continuously engaged brake means acting on said spools for absorbing the rotational moment of inertia thereof upon deenergization of said clutches;
and image location indicating means coupled to at least one of said drive trains for locating the exact position of microimages on said film.

13. The apparatus as defined in claim 12 further including transparent flats forming a gate cooperating with said film at said aperture during deenergization of said clutches for maintaining the microimage in a predetermined focal plane;
and control means for simultaneously controlling the motor drive direction and clutch energization.

14. Apparatus for selectively transporting film in either of two directions between a first rotatably mounted film spool having a first film wrap diameter, and a second rotatably mounted film spool having a second film wrap diameter and for maintaining continuous film tension regardless of the wrap diameters or the transport direction, comprising:
a drive motor connectable to an electric source;
two pairs of rotatably mounted capstan shafts having mating capstan rollers secured thereto and a pulley affixed to one capstan shaft of each pair for receiving a drive belt trained thereabout from said drive motor for moving said film at a given linear velocity from either spool to the other;
a pair of clutches carried on one of said capstan shafts of each capstan pair;
means operatively connecting each clutch to a respective film spool thereby enabling selective coupling of said motor to said film spools for driving the spool on which said film is being taken up in a film wrapping direction and at a speed such that the peripheral velocity of the outer film wrap is greater than said given velocity;
slip clutch means compensating for the peripheral velocity differential to prevent imposing inordinate stress upon said film; and
an electrical switch having at least two switch positions interposed between said motor and said source for selectively changing the drive direction of said motor thereby changing the transport direction of said film.

15. The apparatus as set forth in claim 14 wherein said coupling means include:
means for driving the spool from which the film is supplied in a film upwrapping direction and at a speed such that the peripheral velocity of the outer film wrap is less than said given velocity;
means establishing different drive ratios between the drive motor and each of said spools comprising a plurality of clutches cooperating with one capstan shaft of each pair for deriving rotational motion therefrom and
slip clutch means interposed between said clutches and said spools.

16. Apparatus for selectively conveying film in either a film threading operational mode for automatically threading film from one of two spools to the other, or in a film transporting operational mode in either of two directions past a projection station and between said two film spools interchangeably serving as film supply and film takeup spools, comprising: a first pair of clutches for selectively coupling a drive motor to a respective one of each of said spools; a second pair of clutches for selectively coupling said drive motor to a respective one of each of said spools; and control means coupling at least one clutch of the first clutch pair to the spool serving as the film takeup spool for driving it in a film takeup direction during the transport mode of operation, and for selectively coupling at least one clutch of the second clutch pair to the spool serving as the film supply spool for driving it in a film supplying direction during the threading mode of operation.

17. The film conveying apparatus as set forth in claim 16 including additionally: capstan means coupled to said drive motor and associated with each of said spools, said capstan means cooperating with said film to assist in moving it from one spool to the other and wherein the direction of film movement is controlled by the direction of operation of said motor.

18. The film conveying apparatus as set forth in claim 17 wherein said capstan means comprise two pairs of cooperating capstans, one pair associated with each of said spools; wherein a clutch of each of said first and second clutch pairs is associated with one pair of capstans and the other clutch of each of said first and second clutch pairs is associated with the other capstan pair, wherein said second pair of clutches are electrically energizable and wherein during the threading mode of operation only the electric clutch associated with said film supply spool is energized.